United States Patent [19]

Nitschke

[11] 4,356,912

[45] Nov. 2, 1982

[54] CONVEYOR DRIVE SYSTEM FOR A GLASS SHEET MANUFACTURING SYSTEM

[76] Inventor: John S. Nitschke, 324 E. Second, Perrysburg, Ohio 43551

[21] Appl. No.: 291,610

[22] Filed: Aug. 10, 1981

Related U.S. Application Data

[63] Continuation of Ser. No. 86,228, Oct. 18, 1979, abandoned.

[51] Int. Cl.³ .............................................. B65G 13/07
[52] U.S. Cl. .................................... 198/790; 198/835; 65/163; 65/348
[58] Field of Search ............... 198/571, 577, 783, 790, 198/832, 834, 854, 855; 65/114, 163, 348–351

[56] References Cited

U.S. PATENT DOCUMENTS

| | | | | |
|---|---|---|---|---|
| 4,032,003 | 6/1977 | Hull | ...................................... | 198/832 |
| 4,133,667 | 1/1979 | Nitschke | ............................. | 198/790 |
| 4,233,053 | 11/1980 | Nitschke | ............................. | 198/790 |

*Primary Examiner*—Joseph E. Valenza

*Attorney, Agent, or Firm*—Reising, Ethington, Barnard, Perry & Brooks

[57] ABSTRACT

A conveyor drive system including an improved control circuit for a glass manufacturing apparatus transports a glass sheet through a glass processing station. The conveyor drive system includes first and second conveyor drives disposed on opposed lateral sides of the station. Each of the conveyor drives includes first and second pulleys and a continuous drive loop trained thereover. The glass plate is supported on a plurality of elongated rollers that extend between the conveyor drives and have their opposed ends supported on and in frictional engagement with the continuous drive loops. A drive motor applies drive torque to the first pulleys, and a pair of counter-poised drive motors apply a counter-torque to the second pulleys. The control circuit for controlling the energization of the first drive motor and the pair of counter-poised drive motors includes a feedback circuit which provides degenerative speed feedback for stabilizing the motion of the conveyor drive system.

5 Claims, 3 Drawing Figures

CONVEYOR DRIVE SYSTEM FOR A GLASS SHEET MANUFACTURING SYSTEM

This is a continuation, of application Ser. No. 086,228, filed Oct. 18, 1979 now abandoned.

TECHNICAL FIELD

The present invention relates to glass manufacturing apparatus, and more particularly to a conveyor drive system for use in such manufacturing apparatus.

CROSS-REFERENCE TO RELATED APPLICATIONS

The present invention is also related to U.S. patent application of Nitschke, Ser. No. 021,136,(Mar. 16, 1979) assigned to the same assignee as the present application, and which is hereby incorporated herein by reference.

BACKGROUND OF THE INVENTION

The present invention is an improvement over the conveyor system described in U.S. Pat. No. 4,133,667, which patent is hereby incorporated herein by reference; therein, the glass manufacturing process generally takes place through a succession of related steps that are carried out at separate stations in an overall glass manufacturing system and each of the stations generally has correspondence to one of the manufacturing steps.

Glass material is conveyed through each of the successive stations at a controlled rate. The glass sheets are conveyed between and within a station by a conveyor mechanism defined by a pair of cooperative conveyor drives spaced apart from one another at opposite sides of the station. Each of the conveyor drives are defined by a continuous drive loop trained over a pair of cooperative pulleys. A plurality of elongated, cylindrical rollers are spaced apart from one another with respect to the direction of glass movement, and have their opposed ends supported on the respective conveyor drives in frictional engagement therewith. The cooperative rotation of the conveyor drives imparts rotational motion to the rollers. A glass sheet carried on the rollers is transported through a station in accordance with the net driving torque applied to the conveyor drives.

As described in U.S. Pat. No. 4,133,667, when the chain of a flat-top steel drive chain and sprocketed pulley arrangement is accelerated or decelerated through the range of zero to one-third of its normal operating speed, it vibrates. These vibrations are due to the slip-stick friction phenomenon that frequently occurs in mechanical drive systems.

Another characteristic of such a chain drive in an oscillating roller-hearth furnace that oscillates a glass sheet load within the furnace by alternately driving the chain sprocket forward and backward is an appreciable amount of lost motion caused by the slack present in the drive chain. This lost motion effect causes the rollers to be momentarily stopped even though the sprocket driving the chain is moving smoothly.

The mechanism described in U.S. Pat. No. 4,133,667 eliminates vibration and lost motion is most minimum tension, dual ended systems. This is accomplished by maintaining a minimum predetermined amount of tension in the active portion of the continuous drive loop by the application of a counter torque to the driven sprocket. However, in larger systems, more rollers are required and thus there are more friction points spaced closer together. In addition, larger motors, which have a slower response, are required.

DISCLOSURE OF THE INVENTION

An object of the present invention is to provide an improved conveyor drive system for a glass manufacturing apparatus. The conveyor system includes a control circuit that provides smooth, stable transport of a glass sheet load through a processing station free of vibrational or lost motion effects.

Another object of this invention is to provide an improved control means for a conveyor drive which is defined by at least one continuous drive loop trained over first and second pulleys mounted at opposite ends of a lateral side of a glass processing station wherein the control means is responsive to a transport speed command signal for providing a first control signal to drive the first pulley in accordance with the transport speed command and wherein the control means includes feedback means for providing a feedback signal corresponding to the rotational speed of the second pulley for the purpose of stabilizing the motion of the conveyor drive.

A further object of the invention is to provide an improved control circuit of a conveyor drive which includes a drive motor for applying a drive torque to a first pulley and a counter-poised drive motor for applying a counter drive torque to a second pulley wherein a continuous drive loop is trained over the first and second pulleys and wherein the control circuit is responsive to the voltage in one of the counter-poised drive motor windings to stabilize the motion of the conveyor drive.

Another object of the present invention is to provide improved control means for a conveyor drive which includes a counter-torque mechanism which is controlled by the control means which includes a servo control loop which performs a comparison of a transport speed command signal with a motor speed feedback signal and reverse drive torque regulators wherein degenerative speed feedback is supplied to the reverse drive torque regulators in order to stabilize reverse motor speeds against variations in torque requirements.

In carrying out the above objects and other objects of the invention a conveyor drive is defined by at least one continuous drive loop trained over first and second pulleys mounted at opposite ends of the lateral side of a glass processing station. A plurality of elongated rollers are spaced apart from one another along the direction of sheet glass travel and extend transversely with respect thereto. The plurality of rollers are in driving engagement with the conveyor drive for rotational motion upon motion of the continuous drive loop. Also included are a first torque means coupled to the first pulley of the conveyor drive and which is responsive to a first control signal for applying a drive torque to the first pulley in accordance with the first control signal and a second torque means associated with the second pulley of the conveyor drive for applying a counter drive torque to the second pulley. An improved control means is responsive to a transport speed command signal for providing a first control signal to drive the first pulley in accordance with the transport speed command. The control means includes feedback means for providing a feedback signal corresponding to the rotational speed of the second pulley for stabilizing the motion of the conveyor drive.

Other advantages of the present invention will be readily appreciated as the same becomes better understood by reference to the following detailed description when considered in connection with the accompanying drawings.

BEST MODE FOR CARRYING OUT THE INVENTION

Figure 1:
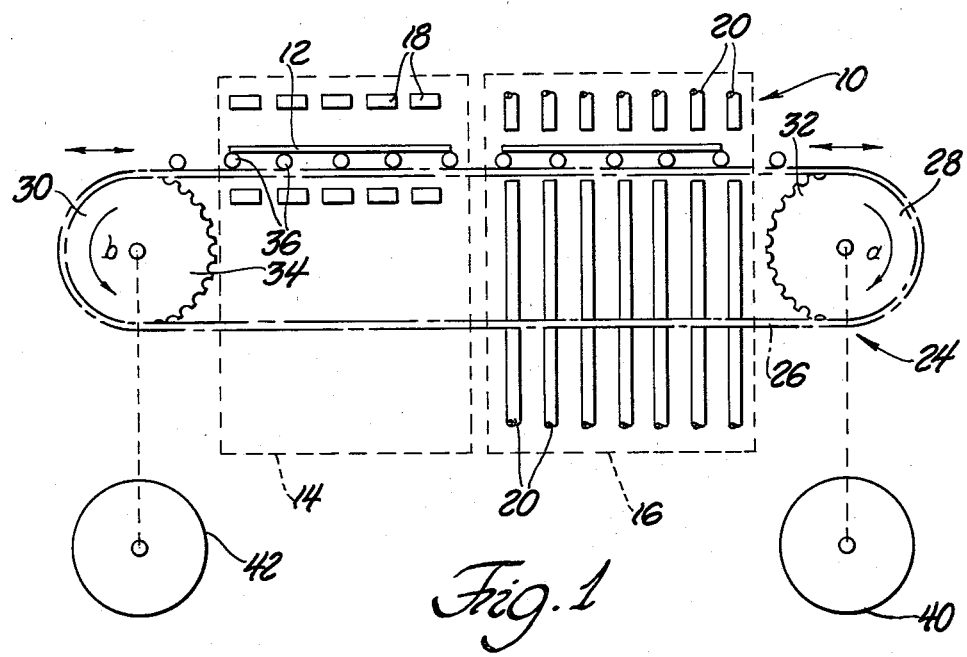
FIG. 1 is a schematic model of a glass processing station having a conveyor drive mechanism incorporated in the present invention.

FIG. 1 schematically illustrates a glass tempering station 10 in a glass manufacturing apparatus. The tempering station 10 is selected as representative of any of a number of different stations in the glass manufacturing apparatus that employ a conveyor drive mechanism for the transport of a glass sheet load through the station. The tempering station 10 includes two distinct stages, a furnace stage 14 and a quench stage 16, each of which performs cooperative functions in the overall glass tempering process.

Broadly, the tempering step can be divided into two basic sub-steps. First, a glass sheet that is to undergo tempering is subjected to heat from a plurality of heating elements 18 in the furnace stage 14 in order to raise the temperature of the glass plate 12 to a relatively high level. In the second sub-step, a plurality of air nozzles 20 subject the glass plate 12 to a flow of cooling air on both of its sides in the quench stage 16.

The tempering station 10 includes a conveyor drive, generally illustrated at 24. The conveyor drive, which as will hereinafter be explained cooperates with a second, like conveyor drive disposed at the opposite lateral side of the station 10, includes a continuous drive loop 26 trained over first and second pulleys 28 and 30 spaced apart from one another along the direction of glass travel indicated by the bidirectional arrows. In the preferred embodiment, the continuous drive loop 26 comprises an endless drive chain or belt and the first and second pulleys 28 and 30 have teeth 32 and 34 formed about their periphery to define sprockets. The endless drive chain may, for example, be 3" wide, ⅜" pitch steel timing chain which is commercially available from Morse Power Company.

A plate glass support bed which may extend up to eighty feet in length is defined by a large number of elongated, cylindrical rollers 36 of the type shown in U.S. Pat. No. 3,994,711. There are more rollers in the support bed herein disclosed than in the support beds of the furnace models disclosed in U.S. Pat. No. 4,133,667 and thus there are more friction points spaced closer together along the drive loop 26. The rollers 36 are preferably formed of fused quartz and are spaced from one another along the direction of travel indicated by the bidirectional arrows, and extend laterally with respect thereto. The opposed end portions of the rollers 36 are supported by and in frictional engagement with the drive reach of the continuous drive loop 26. It will be appreciated that rotational motion of the continuous drive loop 26 imparts motion to each of the elongate rollers 36 through the frictional engagement therebetween. The underside of the drive reach of the drive chain 26 may ride over a wear plate, which is not shown in the view for simplicity of illustration.

The conveyor drive 24 is driven by a first torque source 40. The torque source 40 is coupled to the sprocket 28 to rotationally drive the sprocket 28 in the direction indicated by curved arrow a. The preferred form for the torque source 40 is a DC drive motor.

A second torque source 42 is coupled to the other sprocket 30 to provide a counter torque to the torque applied by the source 40. The second torque source 42 may comprise a counter-poised DC drive motor. The second torque source will assert a counter-torque in the direction of curved arrow b. The counter-torque maintains a minimum level of tension in the active area of the continuous drive loop 26 to prevent vibration and lost motion. Both torque sources 40 and 42 are drive motors which are large enough to move the heavy roll load.

Figure 2:
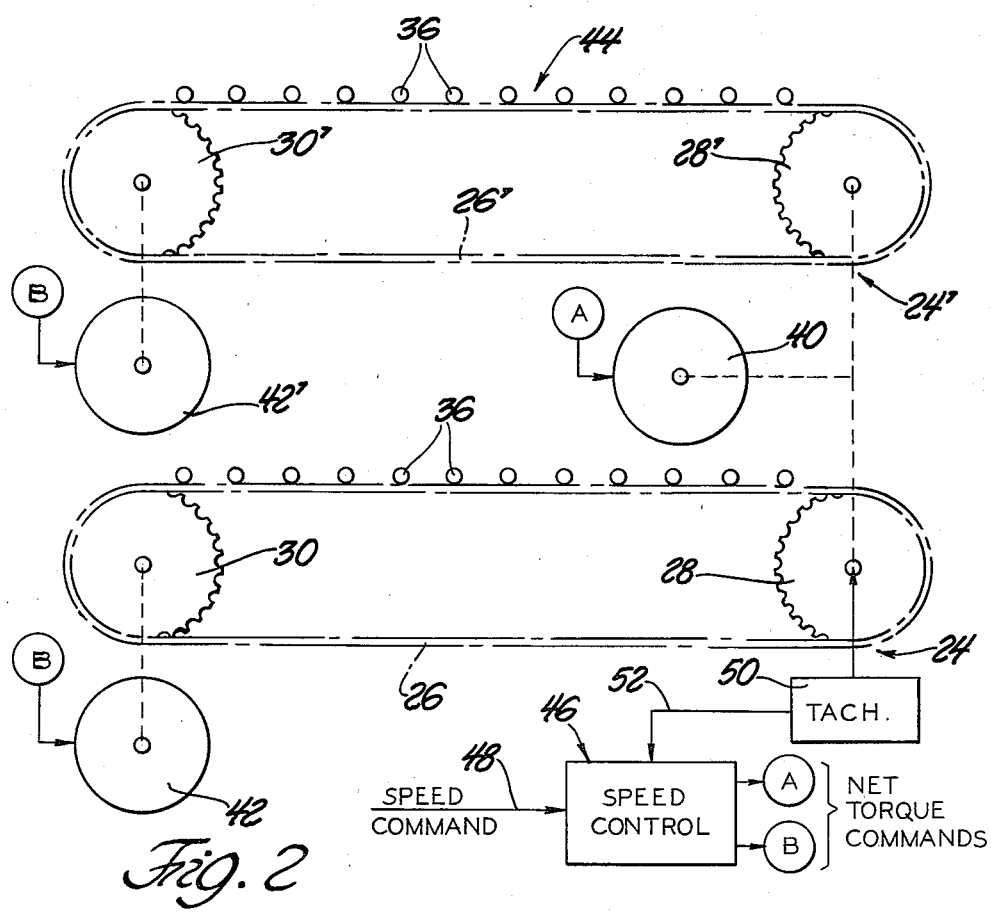
FIG. 2 is a schematic model of an oscillating conveyor mechanism in accordance with FIG. 1 that more fully details the present invention.

Reference is now made to FIG. 2, which shows an oscillating conveyor mechanism 44 in greater schematic detail. The conveyor mechanism 44 includes a first conveyor drive 24, as was shown in FIG. 1, and a second cooperative conveyor drive 24'. In the glass tempering station represented in FIG. 1, the first conveyor drive 24 would be disposed at one lateral side of the station with its longitudinal axis parallel to the direction of glass travel, as indicated by the bidirectional arrows, and the second conveyor drive 24' disposed on the opposite lateral side of the station with its longitudinal axis similarly parallel to the direction of glass travel. The second conveyor drive 24' is in all essential respects substantially the same as the first conveyor drive 24. As was earlier mentioned, the elongated rollers 36 extend between the first and second conveyor drives 24 and 24' and have their end portions supported on and in frictional engagement with the drive reaches of the continuous drive loops 26 and 26'. In the schematic representations of FIG. 2, only the end faces of the elongated rollers 36 are shown for simplicity of illustration.

In the preferred form of the oscillating conveyor drive mechanism 44, the first torque source takes the form of a drive motor 40. The sprockets 28 and 28' are commonly coupled to the output shaft of the motor 40 for simultaneous driving. The drive motor 40 is energized by a first control signal A that represents the net torque command for the motor.

The second torque source preferably comprises a pair of first and second motors 42 and 42'. Each of the motors 42 and 42' is counter-poised with the motor 40, and is separately coupled to respective sprockets 30 and 30'. The counter-poised motors 42 and 42' are each energized by a second control signal B that represents the net torque command for each of the pair of motors 42 and 42'.

Figure 3:
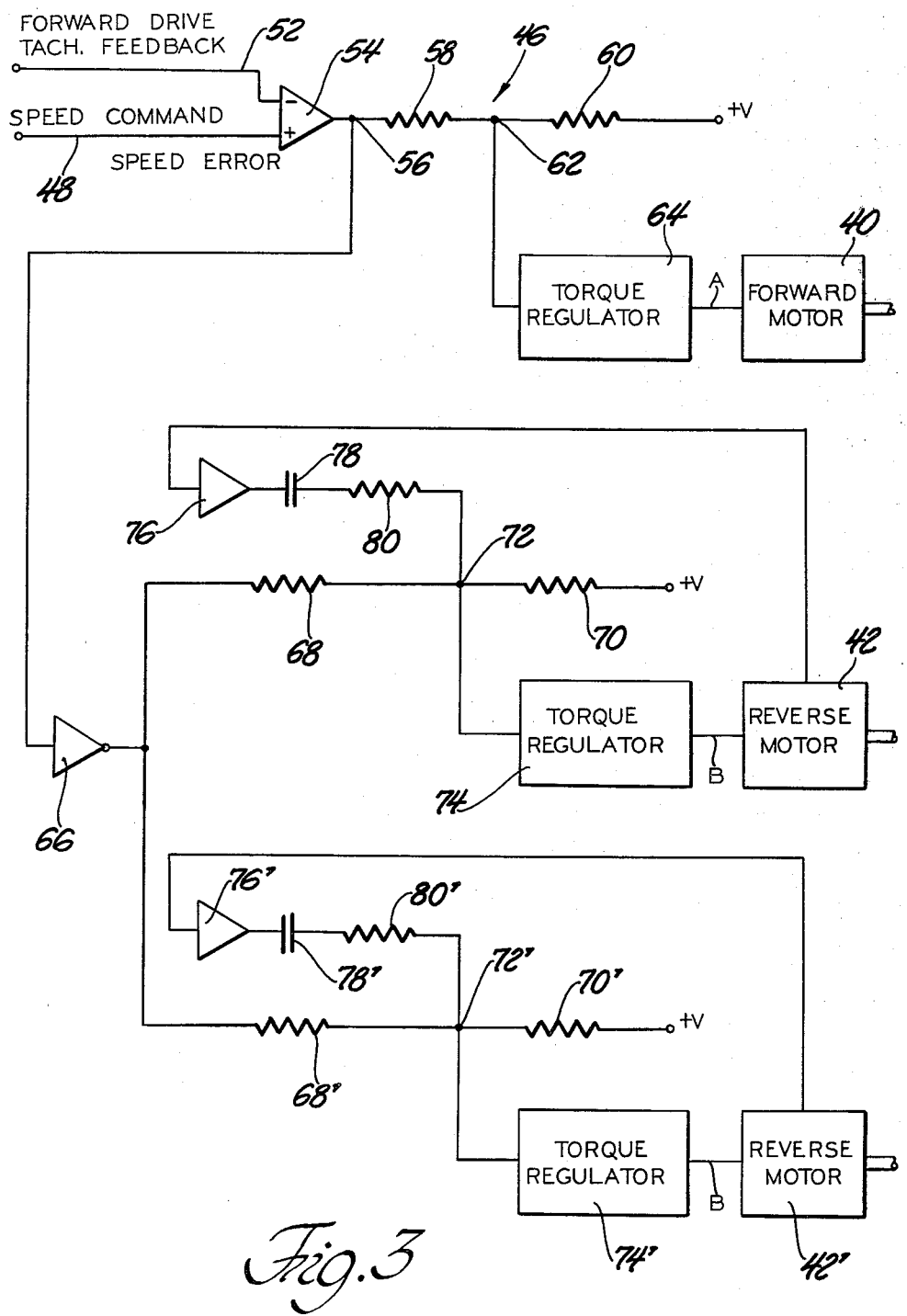
FIG. 3 is a schematic representation of the speed control circuit of FIG. 2.

Referring again to FIG. 2, the first torque source 40 and second counter-torque sources 42, 42', are energized by respective first and second control signals A and B. Each of the control signals, A and B, represents a net torque requirement for the first and second torque sources 40, 42, and 42' and are output from a speed control circuit 46. The speed control circuit 46 has as one input a speed command 48 that represents the speed at which the glass plate is to be transported by the conveyor drive mechanism 44, and has as a second input the output signal from a tachometer 50 that senses the rotational velocity of the strocket 28. The speed control system circuit 46 is shown in greater detail in FIG. 3, to which reference is now made.

The speed control circuit 46 includes a comparator 54 having a non-inverted input 48 and an inverter input 52. The comparator 54 has control voltages +V and −V (not shown) applied thereto which represent the upper and lower bounds of the comparator output signal, respectively. The non-inverted input 48 receives the speed command signal and the inverted input 52 receives the tachometer feedback signal. The output of the comparator 54 is a difference signal related to the difference in value between the speed command and tachometer feedback signals.

The comparator output signal at node 56 is applied to a first control channel having a voltage divider network defined by the serial connection of resistors 58 and 60. The common terminals of resistors 58 and 60 define an output node 62. The other terminal of resistor 60 is held at the reference voltage level +V. The signal appearing at node 62 is applied to a torque regulator 64 that amplifies and regulates the input signal. The output of the regulator 64 is the first control signal A which is applied to the forward drive motor 40.

The signal at node 56 is also applied to a second control channel whose function it is to develop the second control signal B to energize the motors 42 and 42'. The second control channel includes an inverter 66 that receives as input the signal at node 56 and produces as output an inverted representation of the same. The output signal from inverter 66 is applied to two parallel signal paths. One of the paths includes a resistive voltage divider network defined by the serial connection of resistors 68 and 70. The common terminals of resistors 68 and 70 define an output node 72. The other terminal of resistor 70 is held at the reference voltage +V. The signal appearing at node 72 is applied to a torque regulator 74 which amplifies and regulates the input signal. The output of the regulator 74 is second control signal B which energizes the reverse drive motor 42.

The other signal path includes a like resistive voltage divider network defined by the serial connection of resistors 68' and 70'. The common terminals of resistors 68' and 70' define an output node 72'. The other terminal of resistor 70' is held at the reference voltage +V. The signal appearing at node 72' is applied to regulator 74' that amplifies and regulates its input signal. The output of regulator 74' is likewise the second control signal B which energizes the reverse motor 42'. A single signal B could be generated by a single source within the control circuit 46 without departing from the spirit of the invention.

Degenerative speed feedback is preferably taken from the armature windings of the reverse motors 42 and 42' and added to the input of each of the torque regulators 74 and 74' at nodes 72 and 72', respectively, by a feedback loop comprising a serially connected amplifier 76, a capacitor 78 and a resistor 80 connected to the node 72 and by a feedback loop comprising a serially connected amplifier 76', a capacitor 78' and a resistor 80 connected to the node 72'. Each of the amplifiers 76 and 76' provides the necessary circuit isolation and amplification. The capacitors 78 and 78' filter out any DC level component of the feedback signals thereby providing "electrical inertia" to the control circuit 46.

The speed feedback is important to the stability of the system due to the large size of the drive motors 40, 42 and 42' and their slow response to conventional speed regulator action. Furthermore, the speed feedback is particularly important to the stability of the system when the loops 26 and 26' are moving in the forward direction. In that case the tachometer 50 is at the opposite end of the loops 26 and 26' from the critical driving sprockets 30 and 30' and therefore the feedback information provided to the control circuit 46 by the tachometer 50 by itself is not as reliable as provided by the degenerative speed feedback from the motors 42 and 42'. An alternative way of providing such degenerative speed feedback would be to provide tachometers on the shafts of the motors 42 and 42'. The outputs of the tachometers could be supplied to the inputs of their respective amplifiers 76 and 76'.

An alternative way of controlling the system would be to provide a tachometer or other sensor at both ends of the drive 24 and a switch could be employed to sample either one of the tachometer outputs for comparison with the transport speed command depending on the direction of chain travel.

The amount of degenerative speed feedback can be varied for each of the feedback loops by varying the gain of their respective amplifiers 76 and 76' and/or by varying the values of their respective circuit elements 78, 80, and 78' and 80' to stabilize the speeds of the reverse motors 42 and 42' against variations in torque requirements due to slip-stick friction in the conveyor chains.

The speed control circuit 46 can be modified to obtain differing torque relationships by modifying the ratio of the resistance values of the different voltage divider networks. Any desired torque relationship can be established by proper selection of the ratio of resistance values of the resistors in the voltage divider networks.

This invention has been described in an illustrative manner and it is to be understood that the terminology which has been used is intended to be in the nature of words of description rather than of limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. In a conveyor drive system for transporting a sheet glass load through a glass processing station along a direction of travel of the type having: a conveyor drive defined by at least one continuous drive loop trained over first and second pulleys mounted at opposite ends of a lateral side of the processing station; a plurality of elongated rollers spaced apart from one another along the direction of travel and extending transversely with respect thereto, the plurality of rollers being in driving engagement with the conveyor drive for rotational motion upon motion of the continuous drive loop; first torque means, coupled to the first pulley of the conveyor drive and responsive to a first control signal, for applying a drive torque to the first pulley in accordance with the first control signal; first and second electrical drive motors associated with the second pulley of the conveyor drive and responsive to first and second electrical control signals, for applying a resultant counter-drive torque to the second pulley; feedback means associated with the first torque means for producing a feedback signal representative of the rotational speed of the first pulley; an improved control circuit, wherein said control circuit is responsive to a transport speed command signal and the feedback signal, for providing the first control signal to drive the first pulley in accordance with the transport speed command, said control circuit including first and second electrical channel circuits for providing the first and second electrical control signals, respectively, and first and second electrical feedback circuits coupled, respectively, to the first and second electrical drive motors and the first and second electrical channel circuits for providing first and second electrical feedback signals related to an electrical characteristic of the first and second electrical drive motors, respectively, wherein said first and second electrical channel circuits are responsive to said first and second electrical feedback signal for the purpose of stabilizing the motion of the conveyor drive.

2. The conveyor drive system as defined in claim 1 wherein each electrical feedback circuit includes an amplifier connected in series with a resistor and a capacitor.

3. The conveyor drive system as defined in claim 1 wherein the first torque means includes a drive motor and wherein the first and second electrical drive motors comprise counter-poised drive motors, said first and second electrical feedback circuits being responsive to the voltage in their respective counter-poised drive motor windings to stabilize the motion of the conveyor drive.

4. The conveyor drive system as defined in claims 1 or 2 wherein the control circuit is further defined to include, comparator means, having a first input receiving the transport speed command signal and a second input receiving the first feedback signal, for comparing the received signal inputs to produce a difference signal, a first control channel responsive to the difference signal to produce the first control signal as a function of the difference signal, and a second control channel including said first and second electrical channel circuits and responsive to the difference signal and the first and second electrical feedback signals, said first and second electrical feedback signals providing degenerative speed feedback.

5. The conveyor drive system as defined in claim 1 or 2 or 3, wherein the conveyor drive is defined by first and second continuous drive loops, each trained over respective sets of first and second pulleys, each of the continuous drive loops being disposed at opposed lateral sides of the processing station in cooperative relation to one another.

* * * * *